US012044692B2

United States Patent
Sakairi et al.

(10) Patent No.: US 12,044,692 B2
(45) Date of Patent: Jul. 23, 2024

(54) AUTOMATIC ANALYZER

(71) Applicant: Hitachi High-Tech Corporation, Tokyo (JP)

(72) Inventors: Susumu Sakairi, Tokyo (JP); Takenori Okusa, Tokyo (JP); Takahiro Kumagai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 752 days.

(21) Appl. No.: 17/053,844

(22) PCT Filed: Mar. 20, 2019

(86) PCT No.: PCT/JP2019/011710
§ 371 (c)(1),
(2) Date: Nov. 9, 2020

(87) PCT Pub. No.: WO2019/244427
PCT Pub. Date: Dec. 26, 2019

(65) Prior Publication Data
US 2021/0239727 A1    Aug. 5, 2021

(30) Foreign Application Priority Data
Jun. 21, 2018    (JP) .................................. 2018-117588

(51) Int. Cl.
*G01N 35/10*    (2006.01)
*G01N 35/00*    (2006.01)

(52) U.S. Cl.
CPC ..... *G01N 35/1011* (2013.01); *G01N 35/1002* (2013.01); *G01N 2035/0091* (2013.01)

(58) Field of Classification Search
CPC ........... G01N 35/1011; G01N 35/1002; G01N 2035/0091
See application file for complete search history.

(56) References Cited

U.S. PATENT DOCUMENTS

| 4,452,899 A | * | 6/1984 | Alston | ............ G01N 35/00029 422/66 |
| 7,914,462 B2 | * | 3/2011 | Hutchins | .................. G01N 1/36 435/308.1 |

(Continued)

FOREIGN PATENT DOCUMENTS

| CN | 106170704 A | * | 11/2016 | ............ B01L 3/0275 |
| CN | 106170704 A | | 11/2016 | |

(Continued)

OTHER PUBLICATIONS

International Search Report of PCT/JP2019/011710 dated Jun. 18, 2019.

(Continued)

*Primary Examiner* — Manish S Shah
*Assistant Examiner* — Sharad Timilsina
(74) *Attorney, Agent, or Firm* — MATTINGLY & MALUR, PC

(57) ABSTRACT

A countersunk hole is added to a back surface of a dispensing chip mounting position of a sample dispensing chip installation table such that, when the dispensing chip is pulled up from the installation table, the amount of contact of a chip side surface is reduced and the chip is stably mounted. In addition, a posture control member during falling is added to a chip waste position, and the chip is caused to fall vertically and attachment of a sample to a waste route is suppressed. When a dispensing probe moves upward during dispensing chip separation, an upper end of the chip is moved upward up to a position in contact with a base and stopped and then is moved upward again. Thus, the posture of the chip during separation is stable. Further, plural positions for separating the chip are provided such that the position changes depending on waste timing.

5 Claims, 8 Drawing Sheets

(56) References Cited

U.S. PATENT DOCUMENTS

| | | | |
|---|---|---|---|
| 2005/0145787 A1 | 7/2005 | Prosser et al. | |
| 2008/0240994 A1* | 10/2008 | Shohmi | G01N 35/10 422/400 |
| 2009/0028686 A1* | 1/2009 | Tallis | B65G 61/00 414/793.4 |
| 2013/0280143 A1* | 10/2013 | Zucchelli | G01N 35/00732 422/501 |
| 2017/0059600 A1 | 3/2017 | Obari et al. | |

FOREIGN PATENT DOCUMENTS

| | | | |
|---|---|---|---|
| CN | 108490205 A | 9/2018 | |
| JP | 05-312816 A | 11/1993 | |
| JP | 06-3364 A | 1/1994 | |
| JP | 08-229414 A | 9/1996 | |
| JP | 11-94844 A | 4/1999 | |
| JP | 11-118811 A | 4/1999 | |
| JP | 2002-48806 A | 2/2002 | |
| JP | 2003-260094 A | 9/2003 | |
| JP | 2003-294771 A | 10/2003 | |
| JP | 2003-294772 A | 10/2003 | |
| JP | 2005-337977 A | 12/2005 | |
| JP | 2008-249651 A | 10/2008 | |
| JP | 2012-21805 A | 2/2012 | |
| JP | 2015-169639 A | 9/2015 | |

OTHER PUBLICATIONS

Chinese Office Action received in corresponding Chinese Application No. 201980037863.7 dated Dec. 4, 2023.
Chinese Office Action received in corresponding Chinese Application No. 201980037863.7 dated Apr. 12, 2024.

* cited by examiner

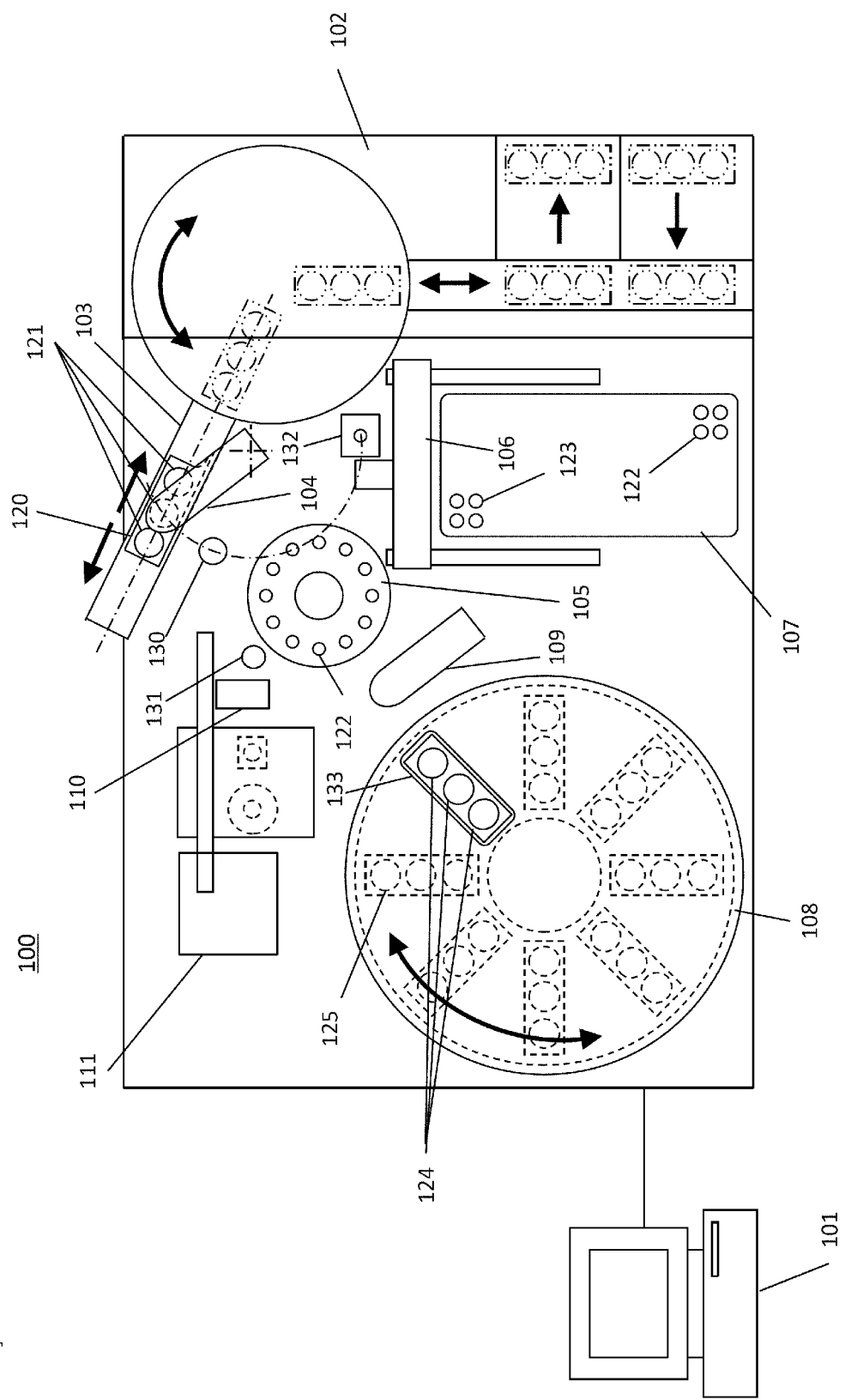
[FIG. 1]

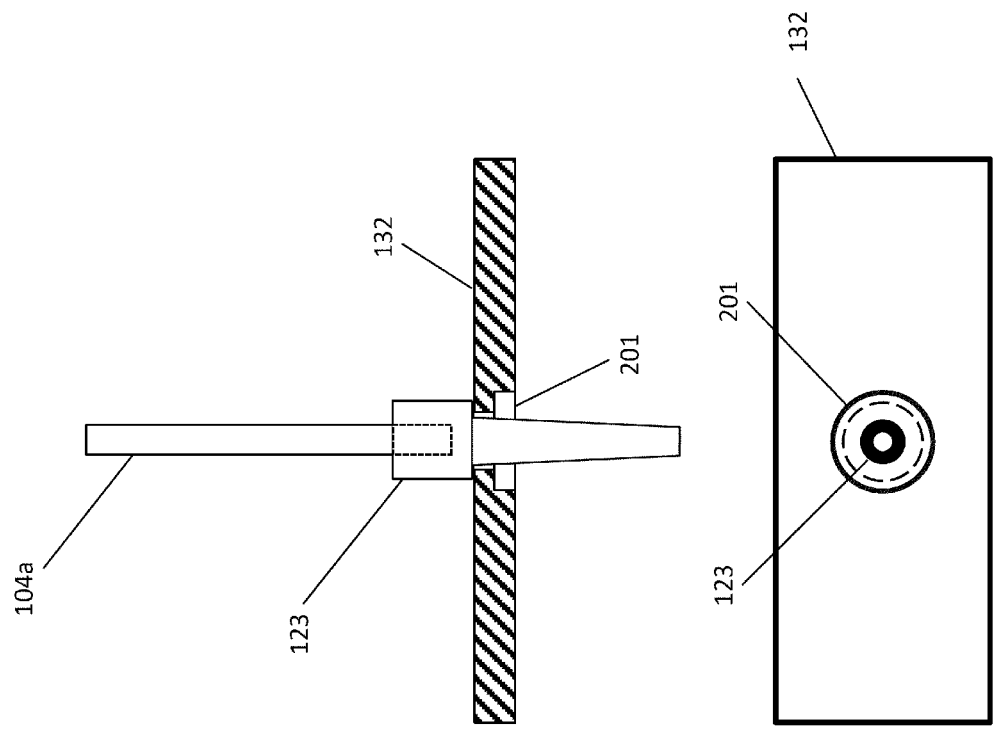
[FIG. 2]

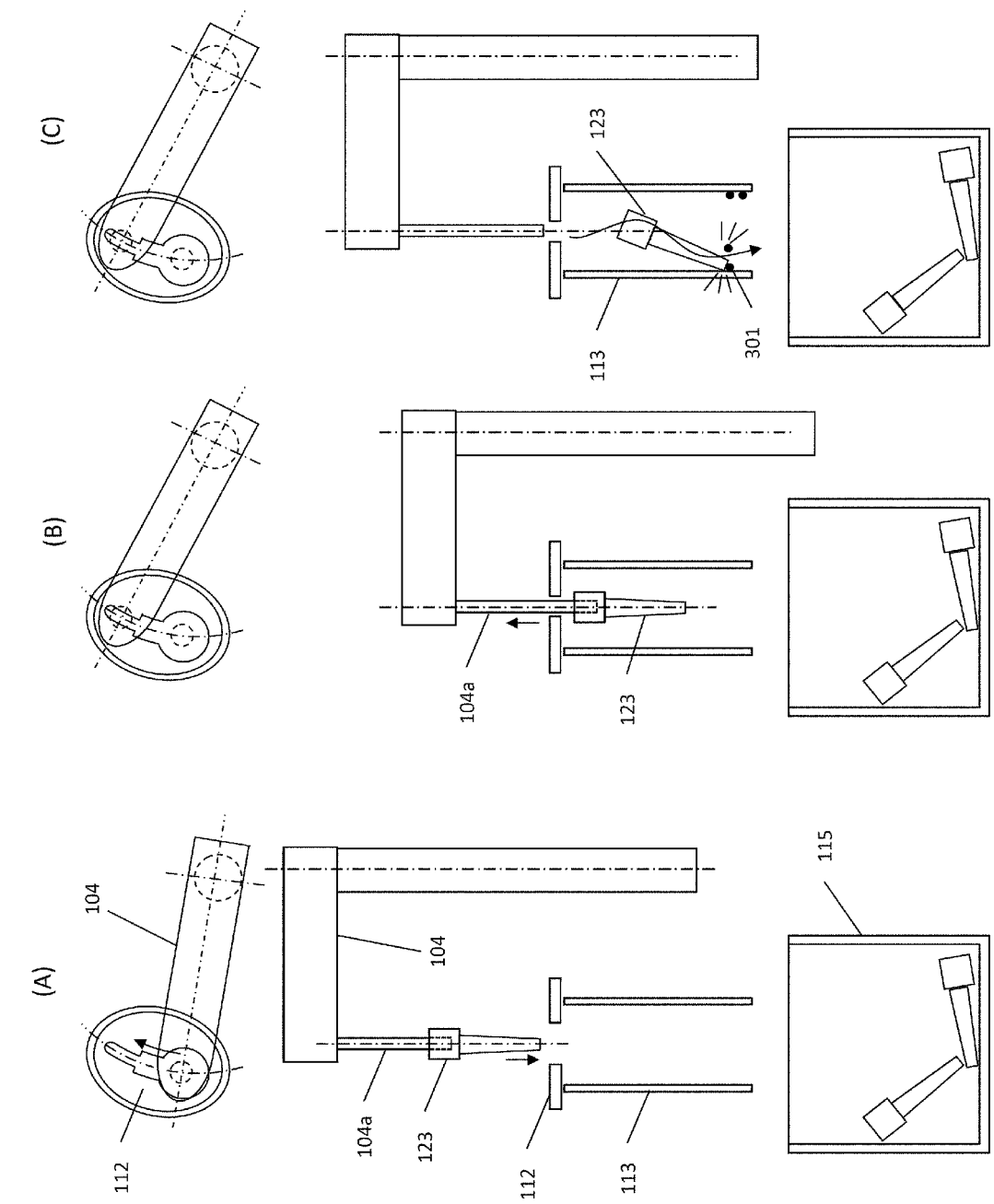
[FIG. 3]

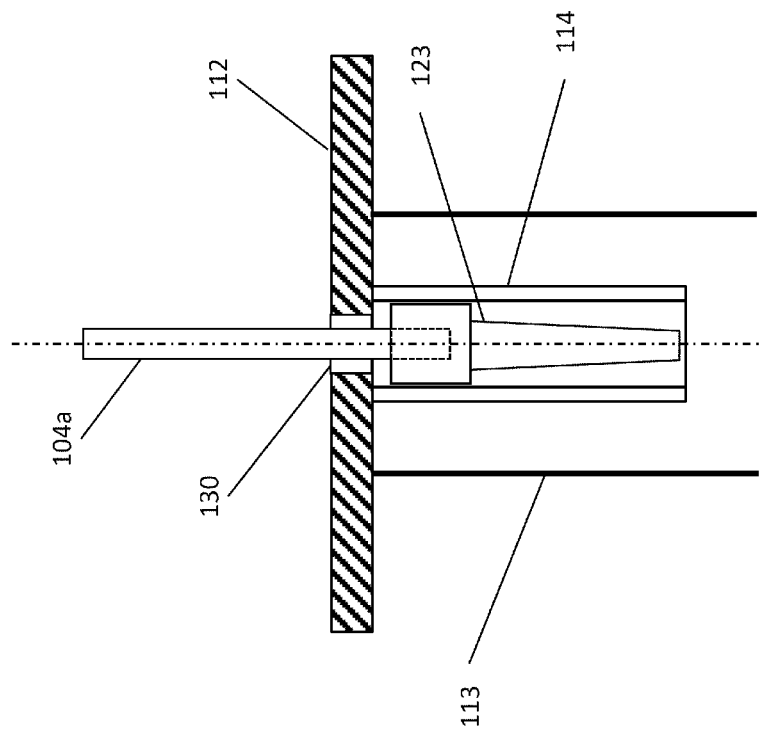

[FIG. 5]
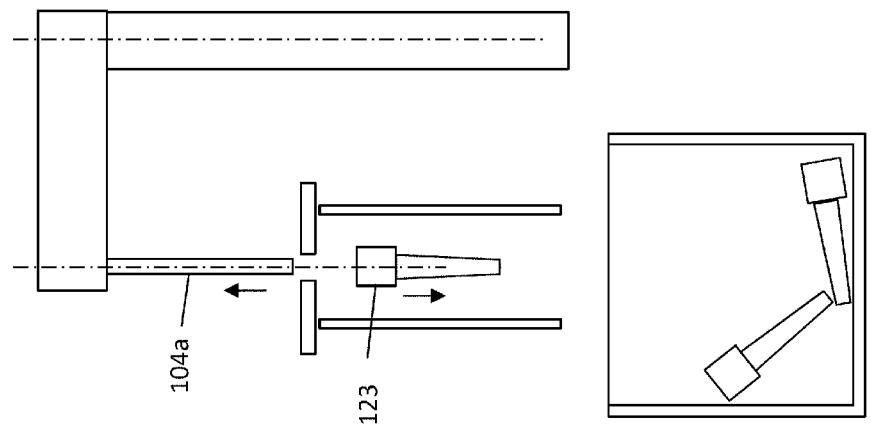
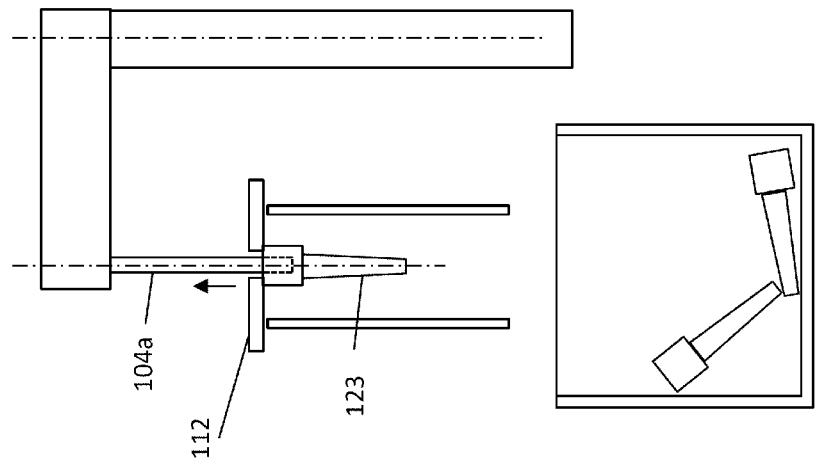
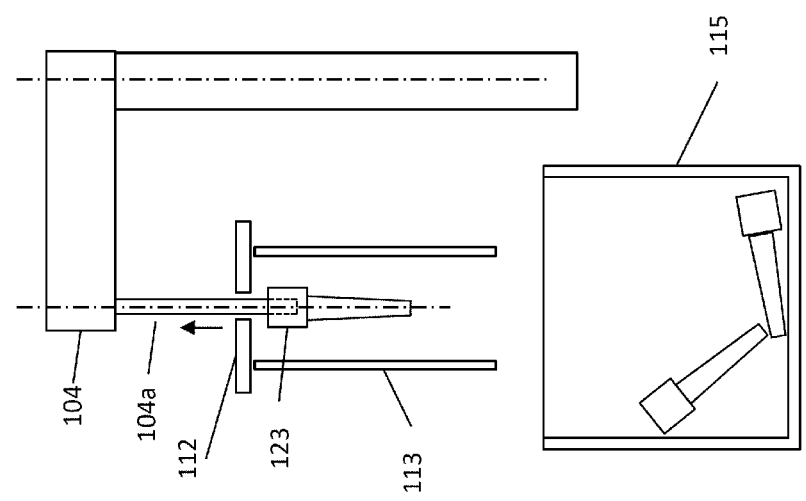

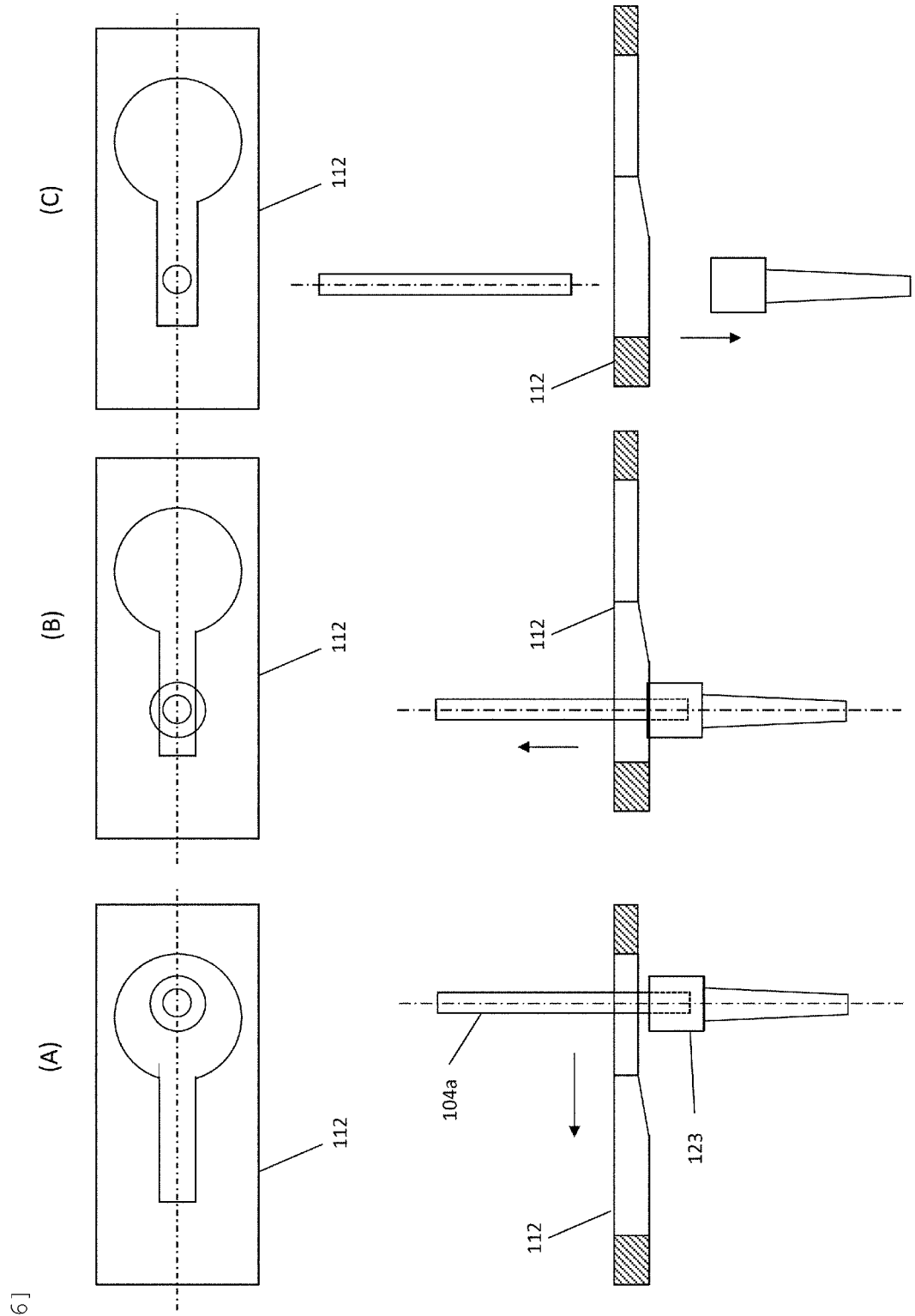

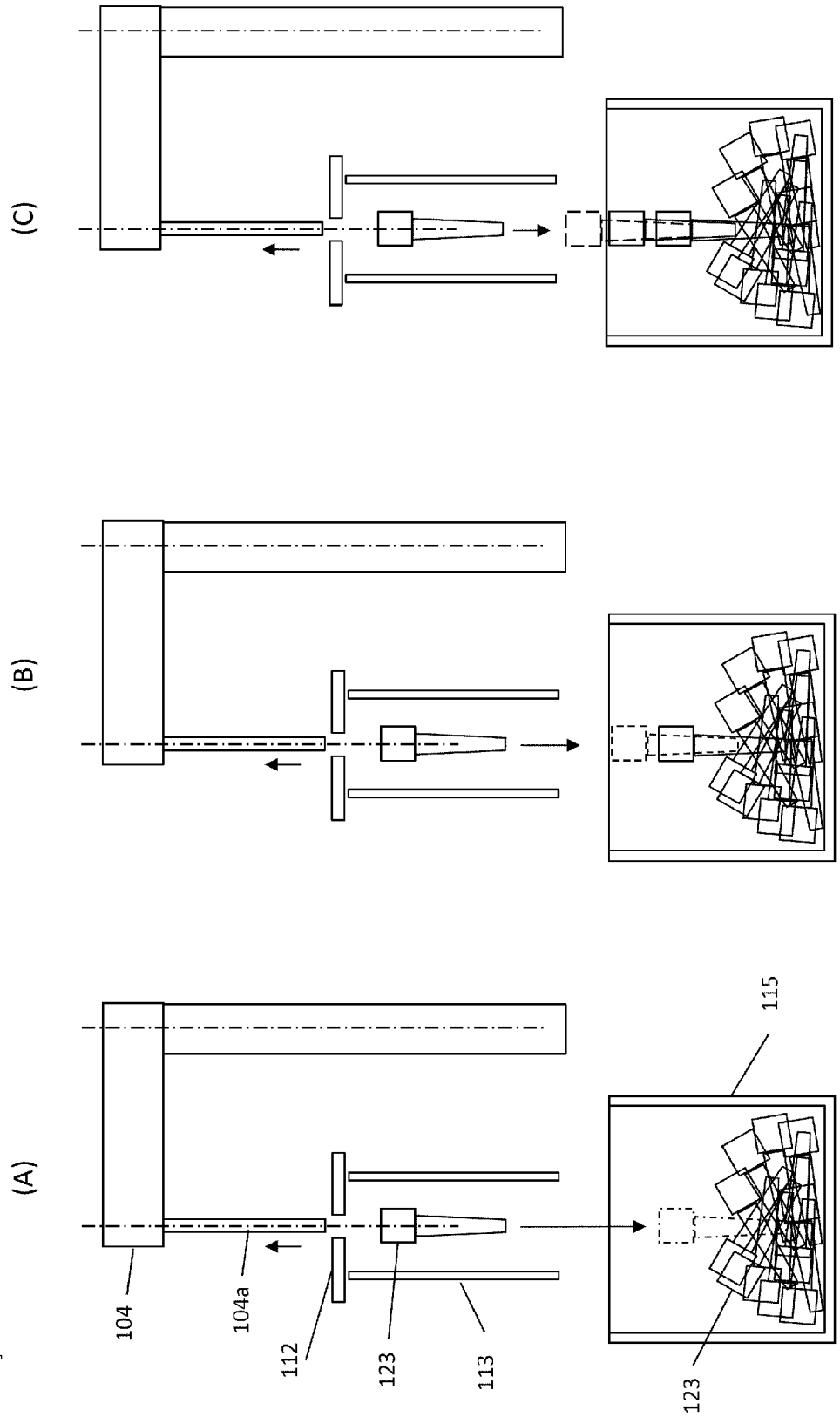
[FIG. 7]

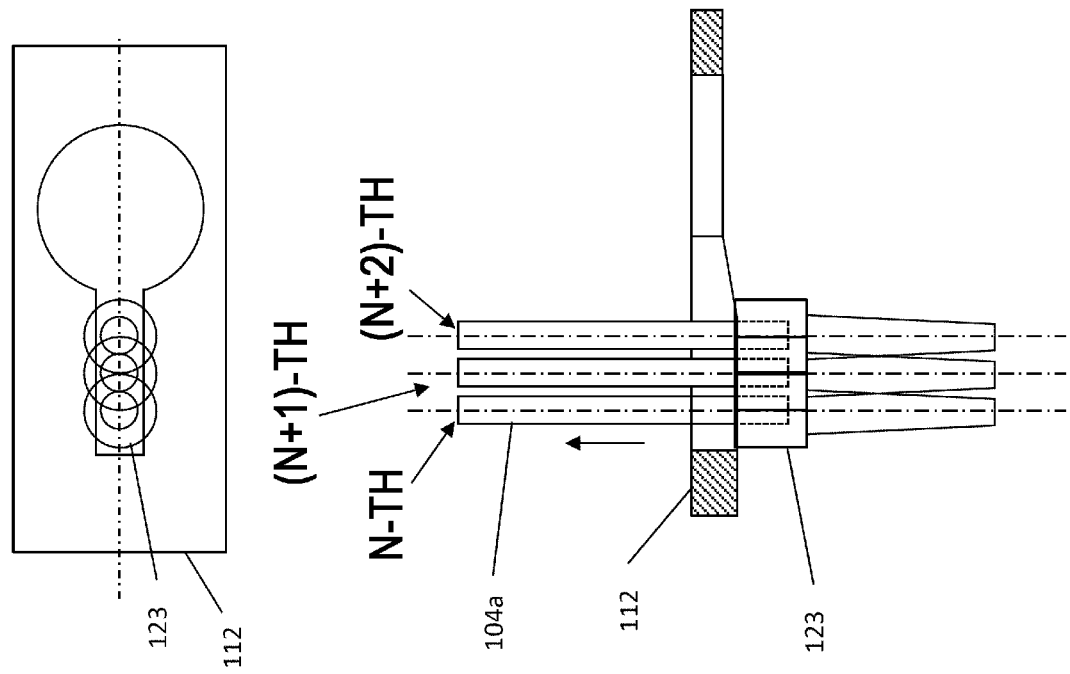
[FIG. 8]

AUTOMATIC ANALYZER

TECHNICAL FIELD

The present invention relates to an automatic analyzer.

BACKGROUND ART

In an automatic analyzer that detects an object to be measured contained in a sample, the sample and a reagent are reacted in the reaction container. At this time, there is a dispensing step in which the sample or the reagent is aspired from a sample container or a reagent container held in the predetermined position by a dispensing probe, and the aspired sample or reagent is ejected into the reaction container held in another predetermined position. In this dispensing step, from the viewpoint of preventing carryover of the sample or reagent, there is an automatic analyzer that is configured such that a disposable dispensing tip is mounted to the tip of the dispensing probe to aspire and eject the sample or the reagent, and the dispensing chip after using is wasted to a predetermined wasting position.

In order to mount this dispensing chip to the dispensing probe, known is a method of inserting and pressing the dispensing probe to dispensing chip disposed in an installation table. When the dispensing chip is wasted, there is a method of falling the dispensing chip from the hole of the predetermined position into the waste box. In that case, by upward moving the dispensing probe in a state where the upper end of the dispensing chip is hooked to the base, the dispensing chip is separated from the dispensing probe to be freely dropped into the waste box. There is a configuration of surrounding a falling route with a waste cylinder in order to prevent the dispensing chip from scattering during the falling. As a patent document relating to such a dispensing device, for example, PTL 1 is disclosed.

CITATION LIST

Patent Literature

PTL 1: JP-A-H11-118811

SUMMARY OF INVENTION

Technical Problem

In an automatic analyzer using a dispensing chip in a dispensing step of a sample or a reagent, the dispensing chip is repeatedly mounted and wasted depending on the analysis. However, due to mounting failure of dispensing chips or attachment of a residual liquid such as a sample or a reagent attached to a dispensing chip tip to a waste route during waste, the dispensing chip is attached to the waste route to cause the waste route to be narrowed and clogged so that the dispensing chips cannot be wasted. Otherwise, there has been a problem that, due to continuous falling of the dispensing chips at the same point to be accumulated in a bamboo shoot shape, the dispensing chips are overflowed even if there is a room for waste in a waste box.

An object of the present invention is to provide an automatic analyzer capable of solving the above problems and preventing the mounting failure of dispensing chips and the incapability of waste.

Solution to Problem

In order to achieve the above object, according to the present invention, provided is an automatic analyzer including a second member having a tip to which a first member is attached; an installation table having a hole through which the first member passes; and a controller that performs a control such that the first member is mounted on the second member by pressing the second member against the first member that passes through the hole, in which the hole includes a first cylindrical position and a second cylindrical position, the first cylindrical position being provided on an upper side in a gravity direction, and the second cylindrical position being disposed to be connected to a lower side of the first cylindrical position in the gravity direction and having a larger diameter than the first cylindrical position.

In order to achieve the above object, according to the present invention, provided is an automatic analyzer including a second member having a tip to which a first member is attached; a waste box in which the first member is wasted; a waste table that is disposed above the waste box in a gravity direction and includes a third member having a recessed portion through which the second member passes; and a controller that performs a control such that the second member is inserted into the recessed portion from a horizontal direction and is moved upward in the gravity direction, in which the controller performs a control such that, after completion of a first process in which the second member is stopped at a first position of the recessed portion and then moved upward in the gravity direction, when the second member is inserted into the recessed portion from the horizontal direction, the second member is stopped at a second position of the recessed portion different from the first position and then is moved upward in the gravity direction.

Advantageous Effects of Invention

It is possible to solve the problems of the mounting failure of dispensing chips, the clogged of dispensing chips in a waste cylinder, and the accumulation of dispensing chips in a bamboo shoot shape to be overflown from a waste box.

BRIEF DESCRIPTION OF DRAWINGS

FIG. 1 is a diagram illustrating an example of an overall configuration of an automatic analyzer according to each embodiment.

FIG. 2 is a diagram illustrating an example of a structure of a mounting device of a sample dispensing chip installation table in Embodiment 1.

FIG. 3 is a diagram illustrating a problem of a waste operation of a sample dispensing chip in Embodiment 2.

FIG. 4 is a diagram illustrating an example of a posture control member during sample dispensing chip waste in Embodiment 2.

FIG. 5 is a diagram illustrating an upward movement operation during sample dispensing chip separation in Embodiment 3.

FIG. 6 is a diagram illustrating an example of a configuration of a dispensing chip waste table in Embodiment 4.

FIG. 7 is a diagram illustrating a problem occurring in a case where the dispensing chip is separated at one position in Embodiment 5.

FIG. 8 is a diagram illustrating a case where the dispensing chip is separated at plural positions in Embodiment 5.

DESCRIPTION OF EMBODIMENTS

Hereinafter, a mode for carrying out the present invention is described with reference to the drawings. First, the overall configuration of the automatic analyzer to which the present invention is applied, and the problems of the dispenser of the automatic analyzer in the related art described above are described with reference to the drawings.

FIG. 1 is a diagram illustrating an example of an overall configuration of an automatic analyzer according to each embodiment. The figure illustrates the configuration of the plane of an automatic analyzer 100 disposed on the XY plane, which is a horizontal plane, as viewed from above (in the Z direction). The X direction and the Y direction are directions orthogonal to each other for configuring a horizontal plane, and here, the X direction corresponds to the horizontal width direction of the device 100, and the Y direction corresponds to the vertical width direction of the device 100. The Z direction is a perpendicular direction vertical to the X direction and the Y direction, and corresponds to the height direction of the device 100.

The automatic analyzer 100 includes a control computer 101 which is a controller, a rack transport portion 102, a rack transport line 103, a sample dispensing mechanism 104, an incubator 105, a transport mechanism 106, a holding member 107, a stirring mechanism (not illustrated), a reagent disk 108, a reagent dispensing mechanism 109, a reaction container transport mechanism 110, and a detecting unit 111.

The control computer 101 which is a controller controls each mechanism based on the analysis request information of the automatic analyzer 100 to realize each step for analysis. This step includes a dispensing step and the like. The control computer 101 provides the interface to the user.

A sample to be an analysis target of the automatic analyzer 100 is contained in a sample container 121, and the sample container 121 is imported into the automatic analyzer 100 in a state of being installed in a rack 120. The rack transport portion 102 is a mechanism that imports or exports the rack 120 between the outside and the automatic analyzer 100.

The rack 120 imported by the rack transport portion 102 is moved to the sample dispensing position near the sample dispensing mechanism 104 by the rack transport line 103. In the incubator 105, plural reaction containers 122 can be installed in the circumferential portion thereof, and rotational movements in which the reaction containers 122 installed in the circumferential direction are each moved to predetermined positions can be performed.

The transport mechanism 106 can be moved in each direction of three axes of X, Y, and Z. The transport mechanism 106 is a mechanism for transporting sample dispensing chips 123 and the reaction containers 122 and moves in a range of predetermined positions of the holding member 107 that holds the sample dispensing chips 123 and the reaction containers 122, the stirring mechanism (not illustrated) that stirs the reaction containers 122, a dispensing chip waste hole 130 that wastes the sample dispensing chips 123, a sample dispensing chip mounting position 132, and the incubator 105.

The holding member 107 holds the plural unused reaction containers 122 and the plural unused sample dispensing chips 123. First, the transport mechanism 106 moves over the holding member 107, descends to grip the unused reaction container 122, moves upward, moves again over a predetermined position of the incubator 105, and descends to install the reaction container 122 at a predetermined position of the incubator 105.

Subsequently, the transport mechanism 106 moves again above the holding member 107, descends to grip the unused sample dispensing chip 123, moves upward, moves over the sample dispensing chip mounting position 132, and descends to install the sample dispensing chip 123 at the sample dispensing chip mounting position 132. In order to prevent carryover, the sample dispensing chip 123 is mounted at the tip of the probe when the sample dispensing mechanism. 104 dispenses the sample, and is discarded if the dispensing of the sample is completed.

The sample dispensing mechanism 104 can perform a rotation operation on a horizontal plane and can vertically move in the perpendicular direction (Z direction). The sample dispensing mechanism 104 moves above the sample dispensing chip mounting position 132 by the rotation operation and descends, to press-fit and mount the sample dispensing chip 123 at the tip of the probe. The sample dispensing mechanism 104 that mounts the sample dispensing chip 123 at the tip of the probe moves above the sample container 121 placed in the transport rack 120 and descends to aspire the sample held in the sample container 121 by a predetermined amount. The sample dispensing mechanism 104 that aspires the sample moves above the incubator 105 and descends to eject the sample to the unused reaction container 122 held in the incubator 105. If the ejection of the sample is completed, the sample dispensing mechanism 104 moves above the dispensing chip waste hole 130 to waste the used sample dispensing chip 123 from the dispensing chip waste hole 130.

The reagent disk 108 has a disc shape and performs a rotation operation. Plural reagent bottles 124 are disposed on the reagent disk 108. The reagent disk 108 rotates about the central axis in the perpendicular direction on the horizontal plane. Accordingly, the reagent bottles 124 disposed on the reagent disk 108 move in the circumferential direction and are transported at predetermined positions corresponding to the step.

The plural reagent bottles 124 can be installed on the reagent disk 108. Each containing portion has a main body for containing the reagent, aspiration holes 125 accessible to the reagent, and a lid (not illustrated) that can seal the aspiration holes 125. The outer shapes of the entire reagent bottles 124 are substantially rectangular shapes, an opening and closing operation is performed by a reagent container lid opening and closing mechanism (not illustrated). However, the lid is opened and closed according to the timing when the reagent dispensing mechanism 109 and the like are access to the reagent containers 124 to suppress the evaporation or the concentration change of the reagent.

A cover (not illustrated) is provided on the reagent disk 108 so that the entering of dust and the like is prevented and a space portion including the reagent disk 108 is kept warm or cold at a predetermined temperature. That is, the space portion including the reagent disk 108 also functions as a heat insulator or a cold insulator. In an area 133, in order to cause the reagent dispensing mechanism 109 to access the reagent bottles 124, it is preferable to provide an opening in the cover in the area 133 and also provide a reagent container lid opening and closing mechanism. Accordingly, the rotation operation of the reagent disk 108 is not necessary between the opening and closing operation of the lid of the reagent container and the reagent aspiration operation, and thus the time required for the dispensing step can be reduced.

The reagent dispensing mechanism 109 can perform rotation operation in the horizontal plane and vertically move in the perpendicular direction. The reagent dispensing mechanism 109 moves by the rotation operation above the area 133 which is the opening of the cover, descends, immerses the tip of the probe in the reagent in the reagent bottle 124 opened by the reagent container lid opening and closing mechanism, and aspirates the predetermined amount of the reagent. Subsequently, the reagent dispensing mechanism 109 moves upward, moves above the predetermined position of the incubator 105 by the rotation operation, and ejects the reagent to reaction container 122.

The reaction container 122 to which the sample and the reagent are ejected moves to the predetermined position by the rotation of the incubator 105 and transported to the reaction container stirring mechanism (not illustrated) by the transport mechanism 106. The reaction container stirring mechanism (not illustrated) stirs and mixes the sample and the reagent in the reaction container 122 by adding the rotation movement to the reaction container 122. Accordingly, the reaction liquid is generated in the reaction container 122.

The reaction container 122 in which the stirring completed is returned to the predetermined position of the incubator 105 by the transport mechanism 106. The reaction container transport mechanism 110 transfers the reaction container 122 between the incubator 105 and the detecting unit 111. The reaction container transport mechanism 110 grips the reaction container 122, moves upward, and transports the reaction container 122 to the detecting unit 111. The reaction container 122 is analyzed in the detecting unit 111. The reaction container 122 in which the analysis is completed is wasted from a reaction container waste hole 131 by the reaction container transport mechanism 110.

As various embodiments used in the automatic analyzer having the overall configuration described above, embodiments are described in the order of: an embodiment of a dispensing chip installation table for suppressing the mounting failure of the dispensing chip, an embodiment of a member for controlling a posture of a dispensing chip during dispensing chip waste, an embodiment of an operation method of the dispensing probe for controlling a posture of a dispensing chip during dispensing chip waste, an embodiment of a method of controlling a posture of a dispensing chip by a dispensing probe operation and a shape of a dispensing chip waste table, and an embodiment of a dispensing chip separation method at plural positions.

Embodiment 1

Embodiment 1 is an embodiment of the automatic analyzer including a second member having a tip to which a first member is attached, an installation table having a hole through which the first member passes, and a controller that performs a control such that the first member is mounted on the second member by pressing the second member against the first member that passes through the hole, and the hole of installation table includes a first cylindrical position being provided on an upper side in a gravity direction and a second cylindrical position being disposed to be connected to a lower side of the first cylindrical position in the gravity direction and having a larger diameter than the first cylindrical position.

That is, Embodiment 1 is an embodiment of a configuration of an installation table which includes a dispensing probe which is a second member having a tip to which a dispensing chip which is the first member is attached, an installation table having a hole through which the dispensing chip passes, and a controller that performs a control such that the dispensing chip is mounted on the dispensing probe by pressing the dispensing probe against the dispensing chip that passes through the hole, and in which the hole of the installation table includes the first cylindrical position being provided on an upper side in a gravity direction and the second cylindrical position being disposed to be connected to a lower side of the first cylindrical position in the gravity direction and having a larger diameter than the first cylindrical position so that dispensing chip is installed to suppress the mounting failure of the dispensing chip. The control computer 101 which is a controller performs a control such that the dispensing chip is mounted on the dispensing probe by pressing the dispensing probe against the dispensing chip that passes through the hole.

The sample dispensing mechanism 104 illustrated in FIG. 1 moves above the sample dispensing chip mounting position 132 of the installation table of the dispensing chip by the control of the control computer 101, descends, and press-fits and mounts the sample dispensing chip 123 of the first member to the tip of a nozzle 104a of the second member. Thereafter, the sample dispensing mechanism 104 moves upward, but there is a concern that the mounted sample dispensing chip 123 is bent by the contact between the side surface of the hole of the sample dispensing chip mounting position 132 of the installation table and the side surface of the sample dispensing chip 123. As the length of the side surface of the hole is longer, the influence of friction due to the contact is larger. However, since the embodiment is a method of press-fitting and inserting the sample dispensing chip 123, the sample dispensing chip mounting position 132 requires a certain thickness in order to maintain the strength.

Therefore, in the present embodiment, as illustrated in the upper sectional view and the lower plan view of FIG. 2, a circular countersunk hole 201 is provided on the lower surface of the sample dispensing chip mounting position 132 of the installation table. In other words, the hole of the sample dispensing chip mounting position 132 of the installation table includes a first cylindrical position provided on an upper side in a gravity direction and the second cylindrical position being disposed to be connected to a lower side of the first cylindrical position in the gravity direction and having a larger diameter than the first cylindrical position. By the countersunk hole 201 of the installation table of the present embodiment, when the sample dispensing mechanism 104 moves upward after the sample dispensing chip 123 is mounted, the distance that is concerned to be in contact between the sample dispensing chip 123 and the side surface of the hole of the sample dispensing chip mounting position 132 of the installation table is reduced, and thus the occurrence of the mounting failure such as bending of the tip of the sample dispensing chip 123 can be reduced.

Embodiment 2

Embodiment 2 is an embodiment of a configuration of installing a member that controls a posture of a dispensing chip during sample dispensing chip waste in the automatic analyzer. That is, Embodiment 2 is an embodiment of the automatic analyzer having a configuration in which a posture control member is installed inside the waste route that is disposed between a waste box in which the dispensing chip is wasted and a waste table that is disposed above the waste box in the gravity direction.

FIG. 3 is upper plan views and cross-sectional views for illustrating a waste operation using the waste table of the dispensing chip of the automatic analyzer and a problem thereof. As illustrated in FIG. 3(A), the used dispensing chip 123 is inserted to a waste route 113 extending from a waste table 112 positioned above a waste box 115 for waste to the lower side of the waste box 115 in the gravity direction. Thereafter, by the control of the control computer 101, the sample dispensing mechanism 104 is rotated to FIG. 3(B), and the nozzle which is the sample dispensing probe 104a is pulled up. According to this operation, the used sample dispensing chip 123 is fallen to the waste box 115. However, as illustrated in FIG. 3(C), samples inevitably remain on the side surface of the tip of the wasted sample dispensing chip 123. Therefore, the posture when the sample dispensing chip 123 falls to the waste box 115 is not stable and there is a concern that the sample dispensing chip 123 during falling is in contact with the waste route 113. There is a risk in that sample remaining on the side surface of the sample dispensing chip 123 is attached to the waste route 113, and thus may be bonded to the waste route 113 during waste of the sample dispensing chip 123.

Therefore, in Embodiment 2, in order to stabilize the posture of the sample dispensing chip during sample dispensing chip waste, the posture control member is provided in the waste route disposed between waste table and the waste box. FIG. 4 illustrates a configuration of installing a posture control member 114 that controls the posture of the dispensing chip during sample dispensing chip waste according to the present embodiment. Inside the waste route 113 on the lower side of the waste table 112, for example, the cylindrical posture control member 114 that has a length which is about a width slightly longer than the maximum diameter of the sample dispensing chip 123 is disposed. By the posture control member 114, when the sample dispensing chip 123 is fallen, if the posture of the sample dispensing chip 123 is not stabilized, the sample dispensing chip 123 is in contact with the posture control member 114, but the width of the cylindrical posture control member 114 is narrow, and thus while the sample dispensing chip 123 is fallen, it is possible to control the sample dispensing chip 123 to a stable posture nearly vertical.

Embodiment 3

Embodiment 3 is an embodiment of operating a sample dispensing probe such that the controller of the automatic analyzer controls the posture of the dispensing chip during sample dispensing chip waste. In Embodiment 2, posture controlling during sample dispensing chip falling is realized by providing the new posture control member 114, but in the present embodiment, the posture during sample dispensing chip falling is controlled by studying the operation of the sample dispensing probe by controlling the control computer which is the controller.

That is, the present embodiment is an automatic analyzer having the configuration in which the waste table includes a third member having a recessed portion passing through a second member, and the controller performs control such that the second member is inserted into the recessed portion from a horizontal direction, the first member is moved upward in the gravity direction until the first member comes into contact with the third member, the second member is stopped in a state where the first member is in contact with the third member, and then the first member is moved again upward in the gravity direction. Further, Embodiment 3 is an embodiment of the automatic analyzer having the configuration in which the controller performs a control such that, after the second member is moved upward in the gravity direction at a first speed and stopped, the second member is moved again upward in the gravity direction at a second speed that is slower than the first speed.

As illustrated in FIG. 5, in the present embodiment, the upward movement operation of the sample dispensing probe 104a during the separation of the sample dispensing chip 123 is set to upward movement of two stages. The first upward movement of the sample dispensing probe 104a is started as illustrated in FIG. 5(A), the upward movement to the narrow recessed portion of the waste table 112 is performed as illustrated in FIG. 5(B), the first upward movement is stopped at a position where the sample dispensing chip 123 is in contact with the lower surface of the waste table 112. Accordingly, the upper surface of the sample dispensing chip 123 is sufficiently in contact with the lower surface of the waste table 112, and thus the influence by the vibration of the mechanism can be eliminated. Thereafter, as illustrated in FIG. 5(C), the sample dispensing probe 104a moves upward for the second time, that is, moves upward again, the sample dispensing chip 123 is separated from the sample dispensing probe 104a in a stable posture and can be fallen in a stable posture close to vertical. The controller can perform a control such that the speeds of the upward movements to be different from each other, for example, the first speed of the first upward movement is slower than the second speed of the second upward movement.

Embodiment 4

Embodiment 4 is an embodiment of the shape of the waste table of the sample dispensing chip and the posture control of a dispensing chip by a dispensing probe operation. That is, Embodiment 4 is an embodiment of the automatic analyzer having the configuration in which the waste table includes a third member having a recessed portion through which the second member passes, and the recessed portion of the third member has a first portion having a wide hole and a small thickness and a second portion having a narrower hole and a larger thickness than the first portion which are adjacent to each other. Further, Embodiment 4 is an embodiment of the automatic analyzer having the configuration in which the controller performs a control such that the second member is inserted into the first portion of the recessed portion, is moved to the second portion, and then is moved upward in the gravity direction.

In the present embodiment, as illustrated in the cross-sectional view at the bottom of FIG. 6, the thickness of the first portion of the wide hole of the waste hole that configures the recessed portion of the waste table 112 is thinned, and the thickness of the second portion of a narrow hole of the waste hole is thickened. As illustrated in FIG. 6(A), only by moving the used sample dispensing chip 123 to a position of the narrow second portion from the table portion having the wide waste hole, as illustrated in FIG. 6(B), it is possible to cause the upper surface of the sample dispensing chip 123 to be in in a state of being in contact with the second portion having a narrow waste hole and a large thickness on the lower surface of the waste table 112, and the sample dispensing chip 123 can be stably fallen by upward moving the sample dispensing probe 104a in this state, as illustrated in FIG. 6(C). Therefore, it is not required to cause the upward movement operation of the sample dispensing probe 104a as illustrated in Embodiment 3 to be in a two-stage operation with stopping put therebetween.

Embodiment 5

Embodiment 5 is an embodiment of performing a separation operation of sample dispensing chips at plural positions of the waste table 112. That is, Embodiment 5 is an embodiment of an automatic analyzer which includes a second member having a tip to which a first member is attached, a waste box in which the first member is wasted, a waste table that is disposed above the waste box in a gravity direction and includes a third member having a recessed portion through which the second member passes, and a controller that performs a control such that the second member is inserted into the recessed portion from a horizontal direction and is moved upward in the gravity direction, and in which the controller performs a control such that, after completion of a first process in which the second member is stopped at a first position of the recessed portion and then moved upward in the gravity direction, when the second member is inserted into the recessed portion from the horizontal direction, the second member is stopped at a second position of the recessed portion different from the first position and then is moved upward in the gravity direction.

By the posture stabilization during sample dispensing chip falling by Embodiments 2, 3, and 4, the attachment of the sample attached to the sample dispensing chip to the waste route 113 can be suppressed. However, due to the continuous falling of the sample dispensing chips 123 at the same position, as sequentially illustrated in FIGS. 7(A) to 7(C), the sample dispensing chips 123 are accumulated in a bamboo shoot shape in the waste box 115, to cause the problem that the sample dispensing chips 123 are overflowed from the waste box 115 as illustrated in FIG. 7(C).

In the present embodiment, as illustrated in FIG. 8, separation positions on the second portions of the sample dispensing chips 123 on the waste table 112 at each wasting timing (N-th time, (N+1)-th time, (N+2)-th time, and the like) are sequentially changed and moved, to vary falling positions of the sample dispensing chips 123 so that it is possible to suppress the accumulation of the sample dispensing chips 123 in a bamboo shoot shape in the waste box. In other words, in the present embodiment, the first to N-th positions are provided in the second portion of the recessed portion of the waste table, the control computer 101 that is the controller sequentially stops the sample dispensing probe which is the second member from the first member to N-th position and then performs a control such that the sample dispensing probe upwardly is moved in the gravity direction, and thus it is possible to suppress accumulation of the dispensing chips 123 in a bamboo shoot shape in the waste box.

By combining the above examples, it is possible to provide a more reliable automatic analyzer. The present invention is not limited to the above examples, and includes various modifications. For example, the above embodiments are described in detail for a better understanding of the present invention, and are not necessarily limited to the one including all the configurations of the description. In the above embodiment, only the sample dispensing chip is described, but the same method when the dispensing chip is used can be applied to, for example, the reagent.

Further, for each of the configurations, functions, control computers, and the like described above, the example of creating a program for realizing a part or all of them has been mainly described, but it is obvious that a part or all thereof are may be designed by, for example, an integrated circuit to be realized by hardware. That is, all or part of the functions of the processing unit may be realized by, for example, an integrated circuit such as an application specific integrated circuit (ASIC) or a field programmable gate array (FPGA) instead of the program.

REFERENCE SIGNS LIST

100: automatic analyzer
101: control computer
102: rack transport portion
103: rack transport line
104: sample dispensing mechanism
104a: sample dispensing probe
105: incubator
106: transport mechanism
107: holding member
108: reagent disk
109: reagent dispensing mechanism
110: reaction container transport mechanism
111: detecting unit
112: waste table
113: waste route
114: posture control member
115: waste box
120: sample rack
121: sample container
122: reaction container
123: sample dispensing chip
124: reagent bottle
125: aspiration hole
130: sample dispensing chip waste hole
131: reaction container waste hole
132: sample dispensing chip mounting position
201: countersunk hole
301: sample

The invention claimed is:

1. An automatic analyzer comprising:
a sample dispensing mechanism;
a second member, coupled to the sample dispensing mechanism, having a tip to which a first member is attached;
a waste box in which the first member is wasted;
a waste table that is disposed above the waste box in a gravity direction and includes a third member having a recessed portion through which the second member passes;
a waste route having side walls disposed between the waste box and the waste table in the gravity direction and that contacts an underside surface of the waste table;
a posture control member disposed within the waste route and contacting the underside surface of the waste table, having a diameter greater than a diameter of the third member and less than a diameter of the waste route, and having a length less than a length of the waste route; and
a controller configured to:
insert the second member into the recessed portion in a first position,
rotate the sample dispensing mechanism thereby moving the second member to a second position,
after completion of the rotation of the sample dispensing mechanism to move the second member to the second position, move the second member upward in the gravity direction while in the second position such that the first member contacts the underside surface of the waste table.

2. The automatic analyzer according to claim 1, wherein the recessed portion of the third member has a first portion and a second portion adjacent to each other, the first portion having a wide hole and a small thickness, and the second portion having a narrower hole and a larger thickness than the first portion, and
wherein the second portion is at the second position.

3. The automatic analyzer according to claim 2, wherein the first portion is at the first position.

4. The automatic analyzer according to claim 3,
wherein an N-th position is at the second portion, and
wherein the controller is configured to control the second member to sequentially stop at different N positions within a range of the second position.

5. The automatic analyzer according to claim 1, further comprising:
an installation table having a hole through which the first member passes,
wherein the hole includes a first cylindrical position and a second cylindrical position, the first cylindrical position being provided on an upper side in a gravity direction, and the second cylindrical position being disposed to be connected to a lower side of the first cylindrical position in the gravity direction and having a larger diameter than the first cylindrical position, and
wherein the controller performs a control such that the first member is mounted on the second member by pressing the second member against the first member that passes through the hole.

* * * * *